(12) United States Patent
d'Armancourt

(10) Patent No.: US 10,625,525 B2
(45) Date of Patent: Apr. 21, 2020

(54) AUTOMATIC WIDTH DETECTION

(71) Applicant: Datamax-O'Neil Corporation, Altamonte Springs, FL (US)

(72) Inventor: Sébastien Michel Marie Joseph d'Armancourt, Singapore (SG)

(73) Assignee: DATAMAX-O'NEIL CORPORATION, Orlando, FL (US)

( * ) Notice: Subject to any disclaimer, the term of this patent is extended or adjusted under 35 U.S.C. 154(b) by 0 days.

(21) Appl. No.: 16/256,698

(22) Filed: Jan. 24, 2019

(65) Prior Publication Data
US 2019/0152242 A1 May 23, 2019

Related U.S. Application Data

(63) Continuation of application No. 15/448,042, filed on Mar. 2, 2017, now Pat. No. 10,195,880.

(51) Int. Cl.
*B41J 29/38* (2006.01)
*B41J 2/325* (2006.01)
(Continued)

(52) U.S. Cl.
CPC ............ *B41J 29/38* (2013.01); *B41J 2/325* (2013.01); *B41J 35/36* (2013.01); *G01B 11/046* (2013.01)

(58) Field of Classification Search
CPC ......... G01B 11/02; G01B 11/00; G01B 11/04; G01B 21/02; G01B 11/046; G01B 11/024;
(Continued)

(56) References Cited

U.S. PATENT DOCUMENTS 6,352,332 B1   3/2002  Walker
6,832,725 B2  12/2004  Gardiner et al.
(Continued)

FOREIGN PATENT DOCUMENTS

CN   102175160 A    9/2011
JP   60-233504 A   11/1985
(Continued)

OTHER PUBLICATIONS

Google translation of JP 2004-074706, published on Mar. 2004. (Year: 2004).*
(Continued)

*Primary Examiner* — Huan H Tran
(74) *Attorney, Agent, or Firm* — Alston & Bird LLP

(57) ABSTRACT

A width detecting system includes a sensor-LED array positioned across a path of a media and/or ribbon within a printing apparatus. The LEDs are adapted to produce light directed toward the media and/or ribbon path. The optical sensors are configured to detect the LED light, produce analog signals proportionate to the received amount of light, and transmit the signals to a signal receiving assembly for processing. Additionally or alternatively, a width detecting system can have an array of LEDs facing an array of sensors in such a way that the media and/or ribbon path is located between the arrays. A method for width detection includes analyzing sensor data to determine one or more transition point between media and no-media sections, and calculating media width. The method can include using sensor data collected for a reflective and/or transmissive sensor arrays, and can be used for media and/or ribbon width detection.

19 Claims, 16 Drawing Sheets

(51) Int. Cl.
*G01B 11/04* (2006.01)
*B41J 35/36* (2006.01)

(58) Field of Classification Search
CPC ... G01B 11/043; B41J 11/003; B41J 11/0095; B41J 11/0025; B65H 2511/10; B65H 2511/11; B65H 2701/1311; H04N 1/00734; H04N 1/00745; H04N 1/00755
See application file for complete search history.

(56) References Cited

U.S. PATENT DOCUMENTS

| | | |
|---|---|---|
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,646,869 B2 | 2/2014 | Yamazaki |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,498 B2 | 6/2014 | Dean et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |

(56) References Cited

U.S. PATENT DOCUMENTS

| | | |
|---|---|---|
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,895,459 B2 | 2/2018 | Kato et al. |
| 10,195,880 B2 * | 2/2019 | d'Armancourt ......... B41J 29/38 |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0324012 A1 | 11/2015 | Dyer et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |

(56) References Cited

U.S. PATENT DOCUMENTS

| | | |
|---|---|---|
| 2016/0306769 A1 | 10/2016 | Kohtz et al. |
| 2016/0314276 A1 | 10/2016 | Wilz et al. |
| 2016/0314294 A1 | 10/2016 | Kubler et al. |

FOREIGN PATENT DOCUMENTS

| | | |
|---|---|---|
| JP | 63-054267 | 3/1988 |
| WO | 2013/163789 A1 | 11/2013 |
| WO | 2013/173985 A1 | 11/2013 |
| WO | 2014/019130 A1 | 6/2014 |
| WO | 2014/110495 A1 | 7/2014 |

OTHER PUBLICATIONS

Translation of JP 2004-074706—published on Mar. 2004—from Japan Platform for Patent Information at https://www.j-platpat.inpit.go.jp/p0200, (Year: 2004).*
U.S. Appl. No. 29/530,600 for Cycloine filed Jun. 18, 2015 (Vargo et al); 16 pages.
U.S. Appl. No. 29/529,441 for Indicia Reading Device filed Jun. 8, 2015 (Zhou et al.); 14 pages.
U.S. Appl. No. 29/528,890 for Mobile Computer Housing giled Jun. 2, 2015 (Fitch et al.); 61 pages.
U.S. Appl. No. 29/526,918 for Charging Base filed May 14, 2015 (Fitch et al.); 10 pages.
U.S. Appl. No. 29/525,068 pp. for Tablet Computer With Removable Scanning Device filed Apr. 27, 2015 (Schulte et al.); 19 pages.
U.S. Appl. No. 29/523,098 for Handle for a Tablet Computer filed Apr. 7, 2015 (Bidwell et al.); 17 pages.
U.S. Appl. No. 29/519,892 for Table Computer filed Feb. 6, 2015 (Bidwell et al.); 13 pages.
U.S. Appl. No. 29/468,118 for an Electronic Device Case, filed Sep. 26, 2013 (Oberpriller et al.); 44 pages.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 14/283,282 for Terminal Having Illumination and Focus Control filed May 21, 2014 (Liu et al.); 31 pages; now abandoned.
U.S. Appl. No. 14/277,337 for Multipurpose OPtical Reader, filed May 14, 2014 (Jovanoski et al.); 59 pages; now abandoned.
U.S. Appl. No. 13/367,978, filed Feb. 7, 2012, (Feng et al.); now abandoned.
U.S. Appl. for Tracking Batter Conditions filed May 4, 2015 (Young et al.); 70 pages., U.S. Appl. No. 14/702,979.
U.S. Appl. for Tactile Switch for Mobile Electronic Device filed Jun. 16, 2015 (Bamdringa); 38 pages., U.S. Appl. No. 14/740,320.
U.S. Appl. for System and Method Regulating Barcode Data Injection Into a Running Application on a Smart Device filed May 1, 2015 (Todeschini et al.); 38 pages., U.S. Appl. No. 14/702,110.
U.S. Appl. for Optical Pattern Projector filed Jun. 23, 2015 (Thuries et al.); 33 pages., U.S. Appl. No. 14/747,197.
U.S. Appl. for Method and System to Protect Software-Based Network-Connected Devices From Advanced Persistent Threat filed May 6, 2015 (Hussey et al.); 42 pages., U.S. Appl. No. 14/705,407.
U.S. Appl. for Intermediate Linear Positioning filed May 5, 2015 (Charpentier et al.); 60 pages., U.S. Appl. No. 14/704,050.
U.S. Appl. for Indicia-Reading Systems Having an Interface With a User's Nervous System filed Jun. 10, 2015 (Todeschini); 39 pages., U.S. Appl. No. 14/735,717.
U.S. Appl. for Hands-Free Human Machine Interface Responsive to a Driver of a Vehicle filed May 6, 2015 (Fitch et al.); 44 pages., U.S. Appl. No. 14/705,012.
U.S. Appl. for Evaluating Image Values filed May 19, 2015 (Ackley); 60 pages., U.S. Appl. No. 14/715,916.
U.S. Appl. for Dual-Projector Three-Dimensional Scanner filed Jun. 23, 2015 (Jovanovski et al.); 40 pages., U.S. Appl. No. 14/747,490.
U.S. Appl. for Calibrating a Volume Dimensioner filed Jun. 16, 2015 (Ackley et al.); 63 pages., U.S. Appl. No. 14/740,373.
U.S. Appl. for Augumented Reality Enabled Hazard Display filed May 19, 2015 (Vankatecha et al.); 35 pages., U.S. Appl. No. 14/715,672.
U.S. Appl. for Application Independent DEX/UCS Interface filed May 8, 2015 (Pape); 47 pages., U.S. Appl. No. 14/707,123.
Notice of Allowance and Fees Due (PTOL-85) dated Sep. 26, 2018 for U.S. Appl. No. 15/448,042.
Non-Final Rejection dated Mar. 16, 2018 for U.S. Appl. No. 15/448,042.
Machine-generated translation fo JP 60-230504, published on Nov. 1985.

* cited by examiner

AUTOMATIC WIDTH DETECTION

CROSS-REFERENCE TO RELATED APPLICATIONS

This application is a continuation of U.S. application Ser. No. 15/448,042, filed Mar. 2, 2017, the entire contents of which are incorporated herein by reference.

FIELD OF THE INVENTION

The present invention relates to thermal printing, and more particularly to automatic media and ribbon width detection.

BACKGROUND

Generally speaking, thermal printing industry is lacking a reliable way of media or ribbon width detection, which would be automatic and accurate at the same time.

Standard means of width detection often offer only a part of a solution, by focusing either on automation, or on accuracy. For example, in U.S. Pat. No. 6,352,332 by Walker, a media edge detection method and apparatus uses a single scanning-carriage-based optical sensor to determine a reflectance profile of the paper and pivot the carriage while scanning across the paper. The invention suggests recursively converging the data to get a cumulative error. Japanese Pat. No. 6,354,267 by Takeo discloses a method for detecting the presence of paper using linear pattern of reflective optical sensor disposed over entire width of printing paper or inlet or guide member. Japanese Pat. No. 60,233,504 by Akira et al. discloses a method of paper width detection using LED elements placed at particular intervals. Similarly to the U.S. Pat. No. 6,354,267 patent, this invention does not offer means for correcting the errors encountered in calculating the width. U.S. Pat. No. 8,646,869 by Yamazaki discloses a recording position error measurement apparatus, and an algorithm for calculating the position error measurements in image-based analysis for calculating the width, but it does not mention applying optical sensors for detecting paper width. Moreover, width detection solutions, such as described above, tend to suffer from a high cost of implementation, poor width resolution, or even incomplete automation, requiring some level of user intervention or parts adjustment.

Some inventions are rather automatic, some are rather accurate, but neither of them offers automation and accuracy at the same time. Therefore, a need exists for an automatic and accurate media and ribbon width detection method and apparatus.

SUMMARY

Accordingly, in one aspect, the present invention embraces a system for automatic and accurate media and ribbon width detection.

In an exemplary embodiment, a width detecting system includes a sensor-LED array positioned across a path of a media and/or ribbon within a printing apparatus. The LEDs are adapted to produce light directed toward the media and/or ribbon path. The optical sensors are configured to detect the LED light, produce analog signals proportionate to the received amount of light, and transmit the signals to a signal receiving assembly for processing.

In another exemplary embodiment, a printing region detecting device includes a first assembly having an array of LEDs adapted to produce light directed toward a path of a media and/or ribbon. A second assembly is disposed at a predetermined distance away from the first assembly and facing the media/ribbon path and the first assembly. The second assembly includes an array of sensors configured to produce analog signals in response to receiving the light produced by the LEDs. An analog signal receiving assembly is configured to receive and process analog signals from the sensors.

In another aspect, the present invention embraces methods for width detection of media and/or ribbon.

In an exemplary embodiment, a method of detecting the width of media includes analyzing analog-to-digital converter (ADC) sensor data to determine which sensor of a sensor array provided a transition point between a section with a media and a section with no media; determining which neighbor sensors provided a substantially high and substantially low ADC values; and using those ADC values to calculate width of the media.

In another exemplary embodiment, a method of detecting the width of media includes analyzing analog-to-digital converter (ADC) sensor data to determine an ADC value and a position for a rising edge transition point, indicating a transition from a section with no media to a section with media, and an ADC value and a position for a falling edge transition point, indicating a transition from the section with media to a section with no media; and calculating a width of the media using the determined positions of the rising and falling edges.

In yet another exemplary embodiment, a method of detecting the width of media includes calculating a first width of a media using first sensor data collected for a transmissive sensor array; calculating a second width of the media using second sensor data collected for a reflective sensor array; and calculating a third width of the media using the first and second widths of the media. The transmissive sensor array includes an array of sensors facing an array of LEDs in such a way that the media can pass between the sensor array and the LED array, and is configured to detect light produced by the LEDs and not blocked by the media. The reflective sensor array includes an array of sensors paired with an array of LEDs in such a way that the media can pass above the sensor-LED pairs, and is configured to detect light produced by the LEDs and reflected by the media.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 5B schematically depicts an example of implementation of the method of FIG. 5A, according to an embodiment.

DETAILED DESCRIPTION

The present invention embraces a width detecting system and a printing region detecting device, which can eliminate the need in user intervention and part adjustment, while providing continuous width detection with improved accuracy, by using an array of LEDs and optical sensors.

Figure 1A:
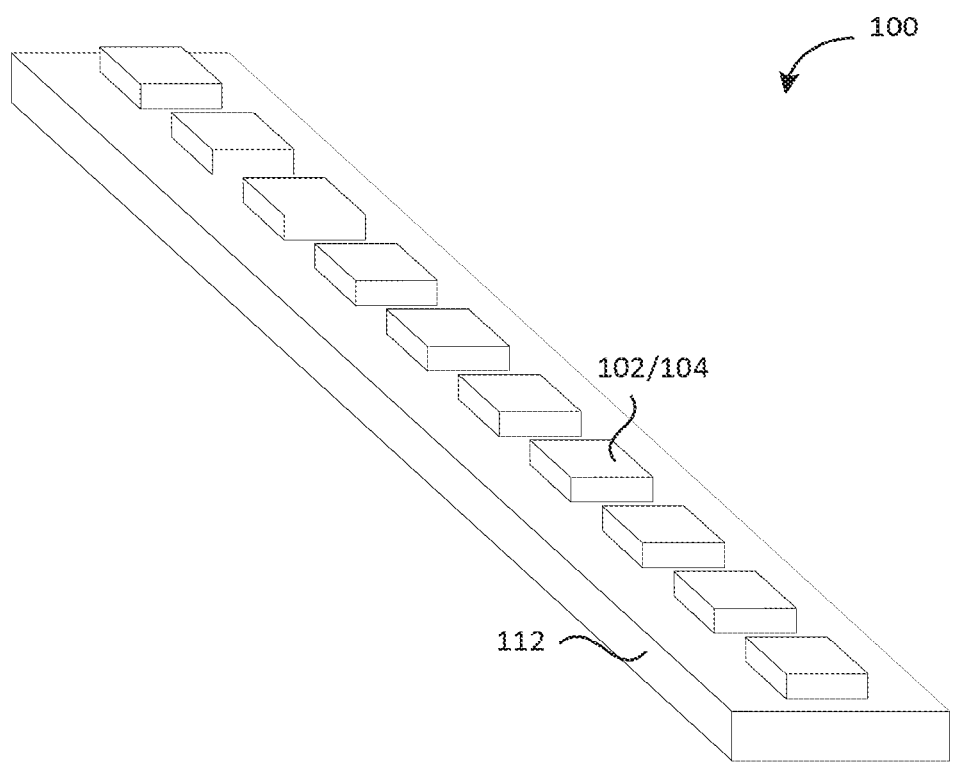
FIG. 1A graphically depicts a width detecting system for a printing apparatus, according to an embodiment.
Figure 1B:
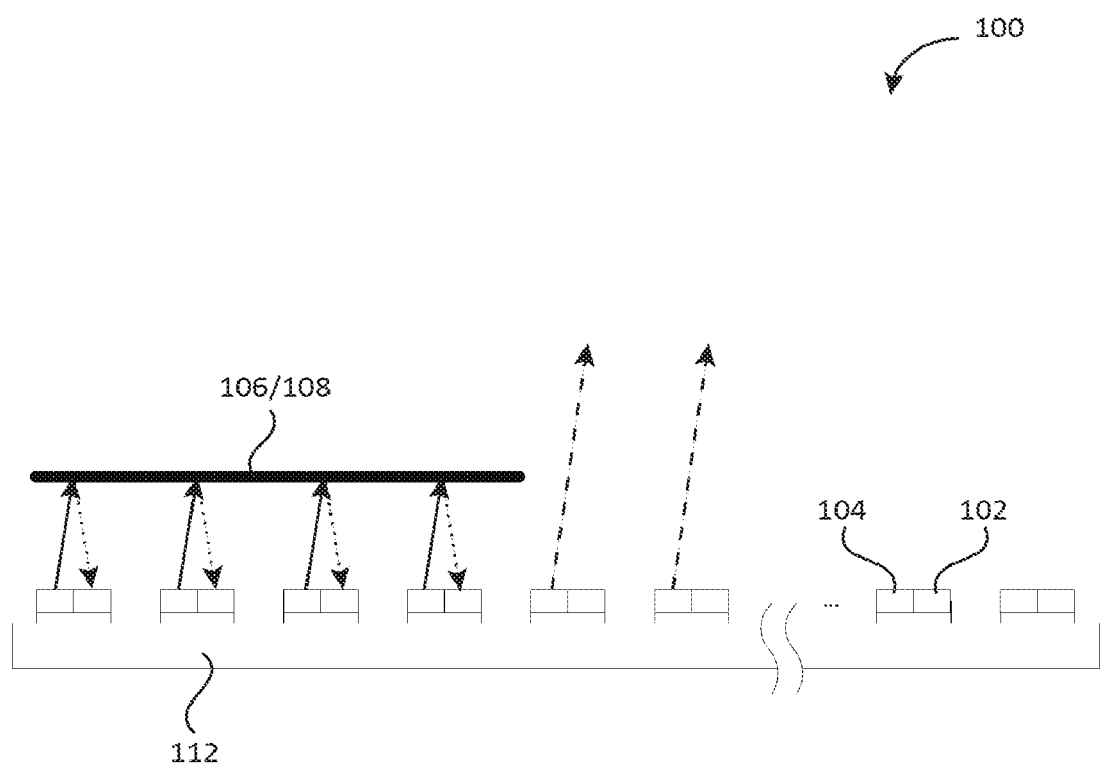
FIG. 1B schematically depicts an interaction of a width detecting system for a printing apparatus with a media and/or ribbon, according to an embodiment.
Figure 2:
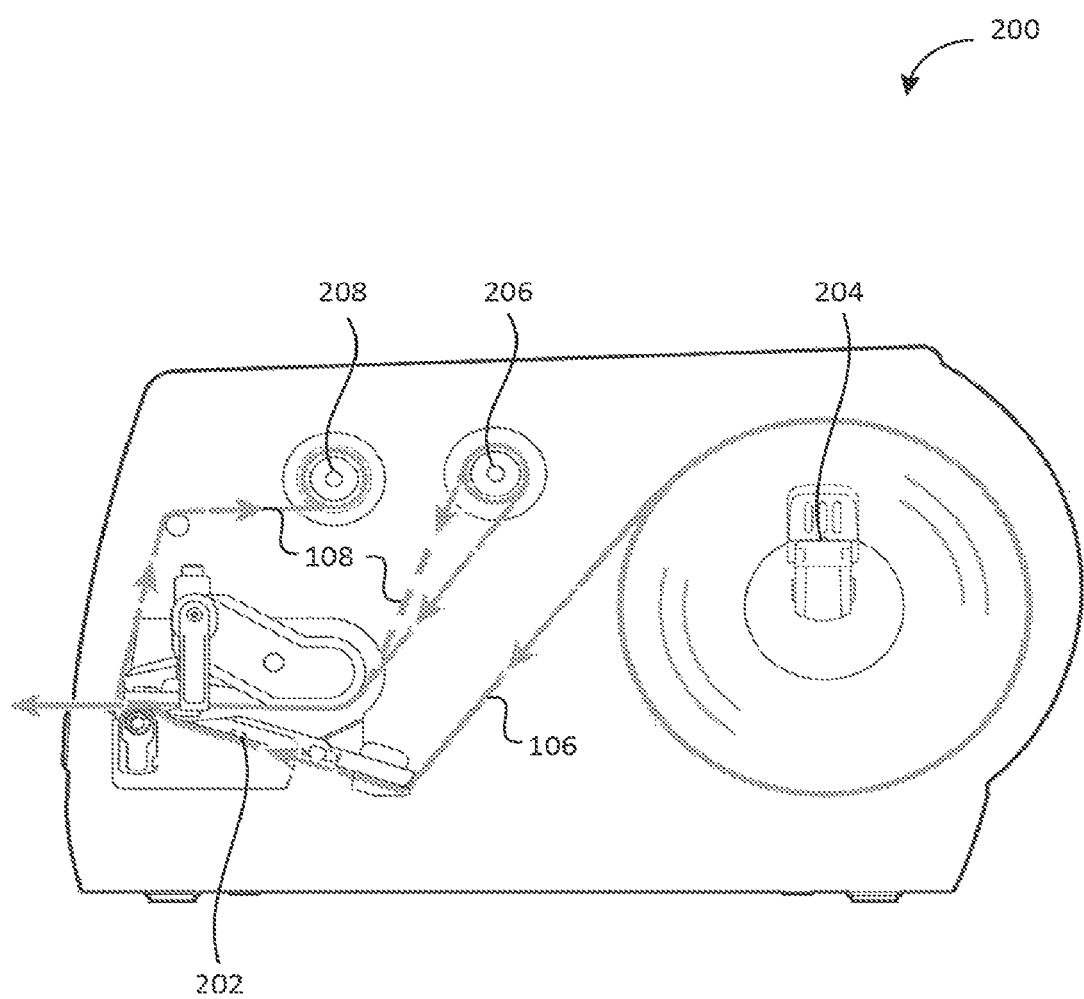
FIG. 2 graphically depicts a media and/or ribbon path within a printing apparatus, according to an embodiment.

In an exemplary embodiment, a width detecting system 100 for a printing apparatus (FIGS. 1A, 1B) includes a sensor-LED array of optical sensor 102 and LED 104 pairs positioned across a path of a media 106 and/or ribbon 108 within a printing apparatus 200 (FIG. 2). A signal receiving assembly 110 (not shown) is configured to receive and process one or more analog signals from the optical sensors 102. The LEDs 104 are adapted to produce light directed toward the media 106 path and/or ribbon 108 path. The optical sensors 102 are configured to detect the light produced by the LEDs 104, and produce the analog signals proportionate to the received amount of light.

In an embodiment, the optical sensors 102 and/or the LEDs 104 can include infrared optical sensors and/or LEDs, respectively. The signal receiving assembly 110 can include a multiplexer. The optical sensors 102 and LEDs 104 can be operably coupled to one or more printed circuit boards (PCB) 112. Depending on an embodiment, each PCB 112 can host an array of sensors 102, an array of LEDs 104, or an array of sensor-LED pairs.

In FIG. 1B, the light produced by the LEDs 104 is shown with solid-line arrows; the light received by the optical sensors 102 is shown with dotted-line arrows; dashed-line arrows correspond to the light produced by the LEDs 104 and not scattered by the media 106 or ribbon 108. The sensor-LED array can be designed to have a width sufficient to cover a maximum media/ribbon width that needs to be detected. In the figure, the width of the media 106 or ribbon 108 is shown narrower than the width of the sensor-LED array, thus leaving some of the sensor-LED pairs not covered by the media/ribbon. For the sensor-LED pairs located under the media/ribbon, the light produced by the LEDs 104 (solid-line arrows) can hit the media/ribbon, and get reflected towards the sensors 102 (dotted-line arrows). For the sensor-LEDs pairs that are not located under the media/ribbon, most of the LED 104 light will not bounce from the media/ribbon (dashed-line arrows), and will not be detected by the sensors 102.

The sensor-LED array can be positioned to face the media 106 and/or ribbon 108 passing above the sensor-LED array. Alternatively, the sensor-LED array can be positioned to face the media 106 and/or ribbon 108 passing below the sensor-LED array.

FIG. 2 shows several possible locations for the sensor-LED array in the printing apparatus 200. As the sensor-LED array may be placed at any location along the media 106 and/or ribbon 108 path, the locations described below are provided for exemplary purposes, and are not meant to be limiting. For example, for media 106 width detection, the sensor-LED array can be disposed proximal to a print mechanism area assembly 202 of the printing apparatus 200. Combining the sensor-LED array with a label stop sensor located in the print mechanism area may lead to apparatus cost reduction; additionally, such a design may be beneficial for embodiments where the media 106 is placed outside of the printing apparatus 200. Alternatively, the sensor-LED array can be disposed proximal to a media hanger assembly 204 of the printing apparatus 200. For ribbon 108 width detection, the sensor-LED array can also be disposed proximal to a ribbon supply assembly 206, or proximal to a ribbon take assembly 208 of the printing apparatus 200.

Figure 3:
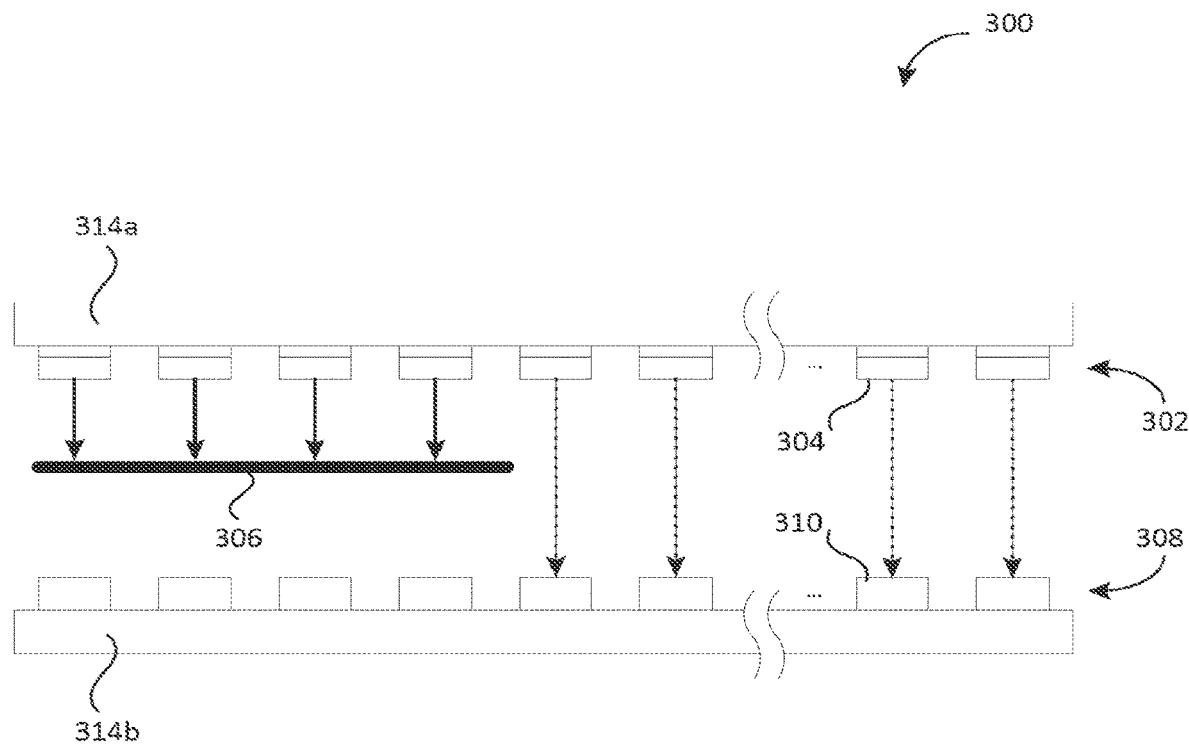
FIG. 3 graphically depicts a printing region detecting device, according to an embodiment.

FIG. 3 shows an exemplary embodiment of a printing region detecting device 300. The device 300 includes a first assembly 302, having an array of LEDs 304 adapted to produce light directed toward a path of a media and/or ribbon 306. A second assembly 308 is disposed at a predetermined distance away from the first assembly 302 and facing the media and/or ribbon path 306 and the first assembly 302. The second assembly 308 includes an array of sensors 310 configured to produce analog signals in response to receiving the light produced by the LEDs 304. An analog signal receiving assembly 312 (not shown) is configured to receive and process one or more analog signals from the sensors 310. In FIG. 3, the light produced by the LEDs 304 and received by the sensors 310 is shown with dotted-line arrows; the light produced by the LEDs 304 and blocked by the media and/or ribbon 306 is shown with solid-line arrows.

In an embodiment, the array of sensors 308 can include an array of infrared sensors, and the array of LEDs 304 can include an array of infrared LEDs. The first assembly 302 can further include an array of secondary sensors proximal to the LED array, and configured to produce analog signals in response to receiving the light produced by the LEDs 304. The second assembly 308 can further include an array of secondary LEDs proximal to the sensor array and adapted to produce light directed toward a path of a media and/or ribbon 306.

An amount of the LEDs 304 can differ from an amount of the sensors 310. Alternatively, there can be equal amounts of the LEDs 304 and sensors 310. Each LED 304 of the LED array can be positioned directly facing a corresponding sensor 310 of the sensor array. In an embodiment, the LEDs 304 of the first assembly 302 and the sensors 310 of the second assembly 308 can be operably coupled to printed circuit boards 314a and 314b, respectively.

In an embodiment, the first assembly 302 can be disposed below the media and/or ribbon path 306, and the second assembly 308 can be disposed above the media and/or ribbon path 306. In another embodiment, the first assembly 302 can be disposed above the media and/or ribbon path 306, and the second assembly 308 can be disposed below the media and/or ribbon path 306.

In an embodiment, the printing region detecting device 300 may be located anywhere along the media and/or ribbon path. For example, the device 300 can be disposed proximal to a print mechanism area. Alternatively, the device 300 can be disposed proximal to a ribbon supply assembly, or a ribbon take assembly. In another embodiment, the device 300 can be proximal to a media hanger area.

FIG. 3 depicts a case when the media is narrower than the assemblies 302 and 308. In the case where the media 306 is positioned between of the sensors 310 and the LEDs 304, the light emitted by the LEDs 304 will be at least partially blocked by the media (solid-line arrows). In the case where the media 306 is not positioned between the LEDs 304 and the sensors 308, the light produced by the LEDs can remain unblocked (dotted-line arrows), and can reach the sensors 308.

In an embodiment, the sensors 308 can then produce an analog signal proportional to the amount of light received. For example, if the LED light is not blocked by the media/ribbon, an analog signal with a high voltage can be produced. If only a portion of the light emitted by the LED is received, or no light is received at all, the sensor 308 can generate a mid-range or low-voltage voltage analog signal, respectively.

The device 300 can further include an analog signal converting means configured to convert the analog signal received from the analog signal receiving assembly 312 into a digital value. Additionally, the device 300 can include a processing means configured to analyze the digital signal, and detect a printing region of the media and/or ribbon. For example, the sensor array 308 can transmit a plurality of analog signals to a multiplexer, which in turn can transmit the signals to an analog-to-digital converter (ADC) device to convert the analog signals to digital signals. The digital signals can then be transmitted to a printer CPU, and one or more width detection algorithms can be applied. In some embodiments, the use of the multiplexer may be optional, and may be omitted; in that case, the plurality of analog signals can be transmitted directly to the ADC having a sufficient amount of channels needed to receive the analog signals.

In an embodiment, a system similar to the width detecting system 100 can be combined with a device similar to the printing region detecting device 300, which may lead to improved width detection accuracy. For example, an embodiment can include a set of sensors facing a set of LEDs, and an additional set of sensors and/or LEDs located within a printing apparatus. Such sets may be placed anywhere along the media and/or ribbon path; e.g., in locations marked in FIG. 2.

Sensor data provided by a sensor array can be further used to calculate width of a media or a ribbon. As used herein, the terms media and ribbon may be used interchangeably and considered synonymous depending on the context, unless further definition is provided.

Figure 4A:
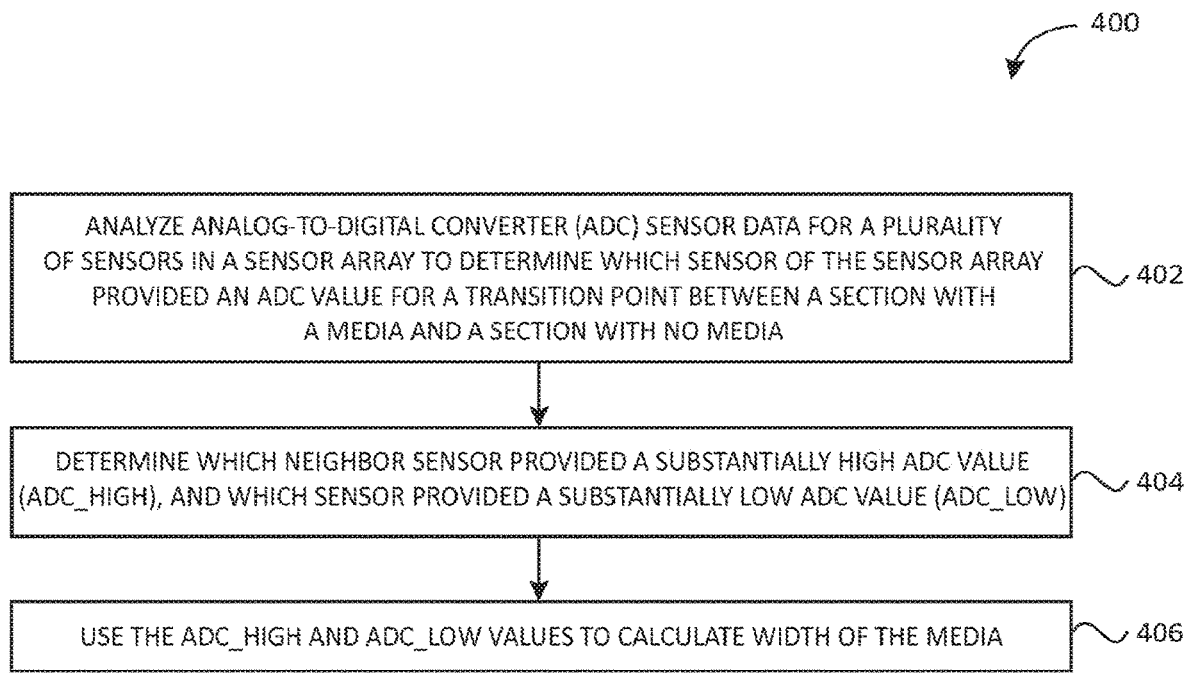
FIG. 4A schematically depicts a method of detecting the width of media, according to an embodiment.

FIG. 4A shows a method 400 of detecting the width of media, according to an embodiment. At 402, analog-to-digital converter (ADC) sensor data for a plurality of sensors in a sensor array is analyzed to determine which sensor of the sensor array provided an ADC value for a transition point between a section with a media and a section with no media. At 404, it is determined which neighbor sensor provided a substantially high ADC value (ADC_high), and which neighbor sensor provided a substantially low ADC value (ADC_low). At 406, the ADC_high and ADC_low values are used to calculate width of the media.

In an embodiment, using the ADC_high and ADC_low values, 406, can include calculating a threshold middle ADC value between the ADC_high and ADC_low values, calculating a difference value between the ADC_high and ADC_low values, and/or calculating a difference between the threshold middle ADC value and the transition point ADC value. The method 400 can include using a linear ratio to calculate the width of the media. Additionally or alternatively, depending on the printer design, the method 400 can include calculating the width using other methods, which will be apparent to those skilled in the art. The method 400 can further include collecting the ADC sensor data.

The method 400 can be configured to use ADC data produced by a reflective sensor array (for example, similar to a sensor array described in relation to FIG. 1B), or a transmissive sensor array (for example, similar to a sensor array described in relation to FIG. 3). In the case of the reflective sensor array implementation, a higher ADC value (ADC_high) will correspond to a section with a media, and a lower ADC value (ADC_low) will correspond to a section with no media. In the case of the transmissive sensor array implementation, a higher ADC value (ADC_high) will correspond to a section with no media, and a lower ADC value (ADC_low) will correspond to a section with a media.

In an embodiment, the method 400 can be used for width detection of media and/or ribbon in a spine align bias printer. For example, the method 400 can be applied for an industrial printer range. Although the description of the method 400 provided above refers to width detection of a media, the method 400 can also be applied for detecting the width of a ribbon.

Figure 4B:
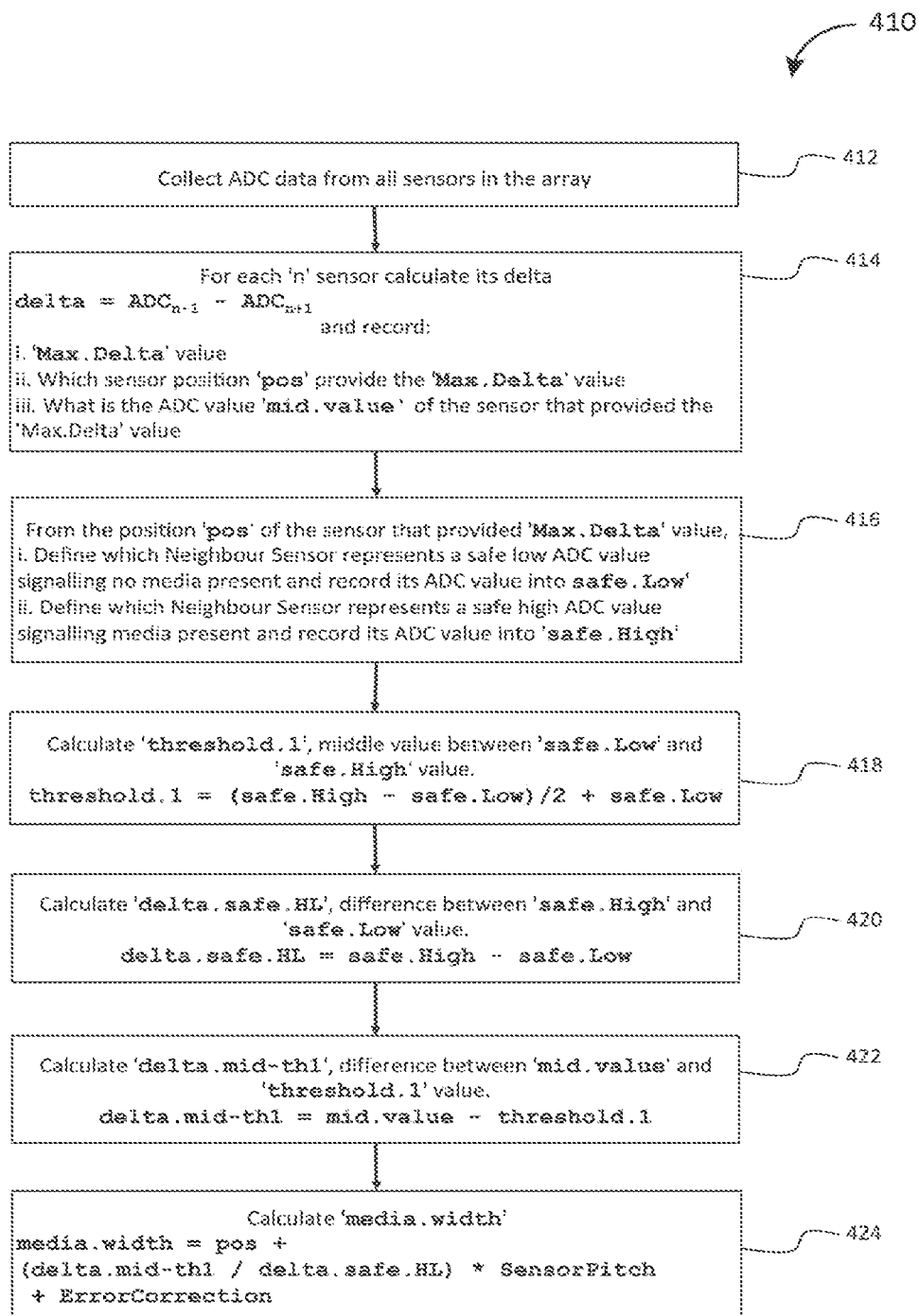
FIG. 4B schematically depicts an example of implementation of the method of FIG. 4A, according to an embodiment.

FIG. 4B shows an example of implementation 410 of the method 400 described in relation to FIG. 4A, according to an embodiment. Values which may be hardcoded in the system include: 'SensorPitch' (distance between two sensors); 'ErrorCorrection' (standard offset predefined during printer development to bring the calculated width to the real width); and 'SafeMargin' (number of sensors acting as neighbors to the 'mid.value' position being checked on each side to determine a 'safe.Low' and 'safe.High' values).

In an embodiment, the method 410 includes 412, collecting ADC sensor data for each sensor in an array, performed by a printer algorithm. At 414, a formula is applied to determine which sensor provided a transition point between a section with media (or ribbon) and a section with no media (or no ribbon). A corresponding ADC value ('mid.value') and position ('pos') of that sensor are stored. At 416, it is determined what represents an ADC value with media present and an ADC value with no media present. At this point, following ADC values are known: no media ('safe.Low'); media ('safe.High'); and transition value between media and no media ('mid.value'). At 418, 420, and 422, an internal threshold value corresponding to a middle point ('threshold.1'), and deltas between different ADC states ('delta.safe.HL' and 'delta.mid-th1') are calculated. At 424, a position of a mid-range value relative the middle point 'threshold.1' between the no-media and media value is examined, and a formula is applied to calculate the width of the media (or ribbon).

Figure 4C:
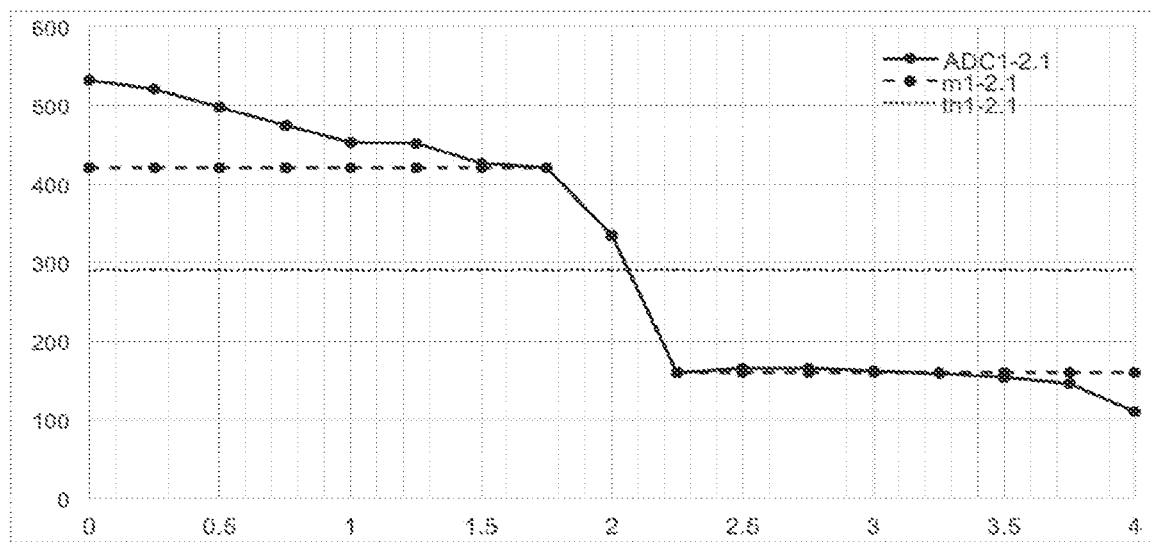
FIG. 4C schematically depicts experimental data acquired using the method of FIG. 4B for a first sample.
Figure 4D:
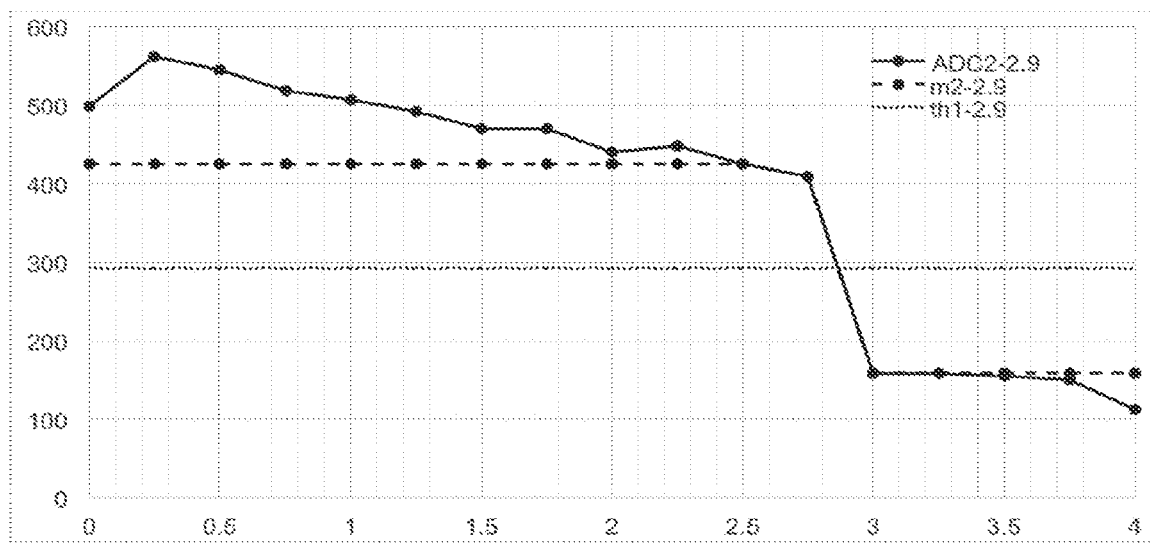
FIG. 4D schematically depicts experimental data acquired using the method of FIG. 4B for a second sample.
Figure 4E:
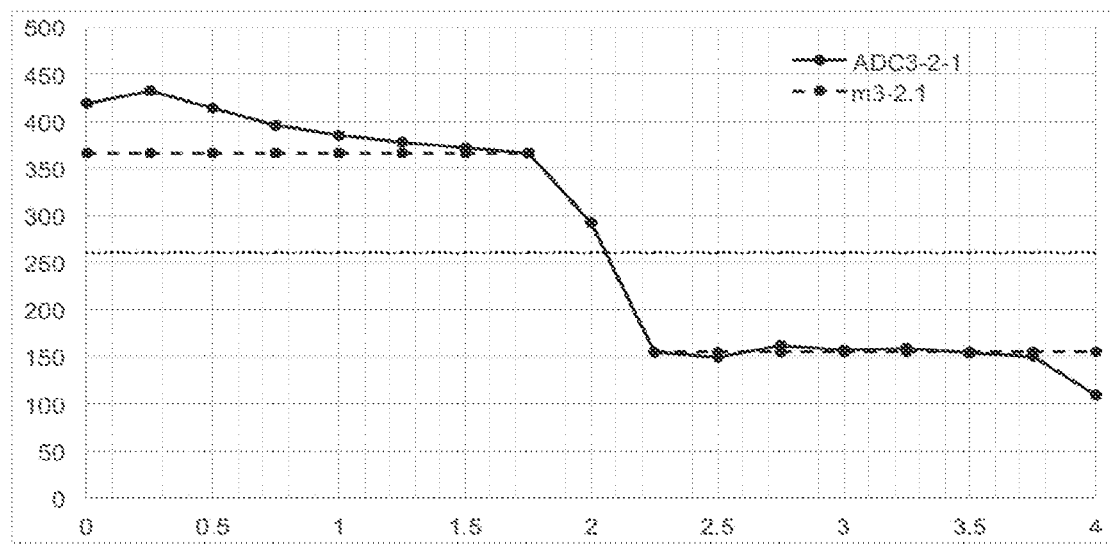
FIG. 4E schematically depicts experimental data acquired using the method of FIG. 4B for a third sample.

FIGS. 4C, 4D, 4E and Tables 1A-1D show experimental data acquired using the method 410, shown in FIG. 4B. Following values were hardcoded: dpi=203; SensorPitch=0.25; SafeMargin=1; ErrorCorrection=0.05.

The data was collected using three media samples:

media 1 was 2.1 in wide and the algorithm detected 2.0916 in (FIG. 4C);

media 2 was 2.9 in wide and the algorithm detected 2.909 in (FIG. 4D); and media 3 was 2.1 in wide and the algorithm detected 2.0873 in (FIG. 4E).

TABLE 1A

Experimental data for width detection obtained with method 410 (step 412).

| # | pos | Media 1 ADC1-2.1 | Media 2 ADC2-2.9 | Media 3 ADC3-2.1 |
|---|---|---|---|---|
| 1 | 0 | 532 | 499 | 419 |
| 2 | 0.25 | 521 | 562 | 432 |
| 3 | 0.5 | 498 | 545 | 414 |
| 4 | 0.75 | 475 | 519 | 396 |
| 5 | 1 | 453 | 507 | 385 |
| 6 | 1.25 | 452 | 492 | 378 |
| 7 | 1.5 | 427 | 470 | 372 |
| 8 | 1.75 | 421 | 470 | 366 |
| 9 | 2 | 334 | 440 | 292 |
| 10 | 2.25 | 160 | 449 | 155 |
| 11 | 2.5 | 165 | 426 | 149 |
| 12 | 2.75 | 165 | 409 | 162 |
| 13 | 3 | 162 | 159 | 157 |
| 14 | 3.25 | 158 | 158 | 159 |
| 15 | 3.5 | 154 | 155 | 154 |
| 16 | 3.75 | 146 | 151 | 150 |
| 17 | 4 | 110 | 112 | 109 |

TABLE 1B

Experimental data for width detection obtained with method 410 (step 412).

| # | pos | m1-2.1 | m2-2.9 | m3-2.1 | th1-2.1 | th1-2.9 | th1-m3-2.1 |
|---|---|---|---|---|---|---|---|
| 1 | 0 | 421 | 426 | 366 | 290.5 | 292.5 | 260.5 |
| 2 | 0.25 | 421 | 426 | 366 | 290.5 | 292.5 | 260.5 |
| 3 | 0.5 | 421 | 426 | 366 | 290.5 | 292.5 | 260.5 |
| 4 | 0.75 | 421 | 426 | 366 | 290.5 | 292.5 | 260.5 |
| 5 | 1 | 421 | 426 | 366 | 290.5 | 292.5 | 260.5 |
| 6 | 1.25 | 421 | 426 | 366 | 290.5 | 292.5 | 260.5 |
| 7 | 1.5 | 421 | 426 | 366 | 290.5 | 292.5 | 260.5 |
| 8 | 1.75 | 421 | 426 | 366 | 290.5 | 292.5 | 260.5 |
| 9 | 2 | 334 | 426 | 292 | 290.5 | 292.5 | 260.5 |
| 10 | 2.25 | 160 | 426 | 155 | 290.5 | 292.5 | 260.5 |
| 11 | 2.5 | 160 | 426 | 155 | 290.5 | 292.5 | 260.5 |
| 12 | 2.75 | 160 | 409 | 155 | 290.5 | 292.5 | 260.5 |
| 13 | 3 | 160 | 159 | 155 | 290.5 | 292.5 | 260.5 |
| 14 | 3.25 | 160 | 159 | 155 | 290.5 | 292.5 | 260.5 |
| 15 | 3.5 | 160 | 159 | 155 | 290.5 | 292.5 | 260.5 |
| 16 | 3.75 | 160 | 159 | 155 | 290.5 | 292.5 | 260.5 |
| 17 | 4 | 160 | 159 | 155 | 290.5 | 292.5 | 260.5 |

TABLE 1C

Experimental data for width detection obtained with method 410 (step 414).

| # | pos | Media 1 delta1 | Media 2 delta2 | Media 3 delta3 |
|---|---|---|---|---|
| 1 | 0 | 0 | 0 | 0 |
| 2 | 0.25 | 34 | −46 | 5 |
| 3 | 0.5 | 46 | 43 | 36 |
| 4 | 0.75 | 45 | 38 | 29 |
| 5 | 1 | 23 | 27 | 18 |
| 6 | 1.25 | 26 | 37 | 13 |
| 7 | 1.5 | 31 | 22 | 12 |
| 8 | 1.75 | 93 | 30 | 80 |
| 9 | 2 | 261 | 21 | 211 |
| 10 | 2.25 | 169 | 14 | 143 |
| 11 | 2.5 | −5 | 40 | −7 |
| 12 | 2.75 | 3 | 267 | −8 |
| 13 | 3 | 7 | 251 | 3 |
| 14 | 3.25 | 8 | 4 | 3 |
| 15 | 3.5 | 12 | 7 | 9 |
| 16 | 3.75 | 44 | 43 | 45 |
| 17 | 4 | 146 | 151 | 150 |

TABLE 1D

Experimental data for width detection obtained with method 410 (steps 414-424).

| | | Media 1 | Media 2 | Media 3 |
|---|---|---|---|---|
| Step 414 | Max.Delta | 261 | 267 | 211 |
| | pos (in) | 2 | 2.75 | 2 |
| | mid.value | 334 | 409 | 292 |
| Step 416 | safe.Low | 160 | 159 | 155 |
| | safe.High | 421 | 426 | 366 |
| Step 418 | threshold.1 | 290.5 | 292.5 | 260.5 |
| Step 420 | delta.safe.HL | 261 | 267 | 211 |
| Step 422 | delta.mid-th1 | 43.5 | 116.5 | 31.5 |
| Step 424 | media width | 2.091666667 | 2.909082397 | 2.087322275 |
| Verification with real media | real size | 2.1 | 2.9 | 2.1 |
| | error in inches | 0.008 | −0.009 | 0.013 |
| | error in dot | 1.69 | −1.84 | 2.57 |

Figure 5A:
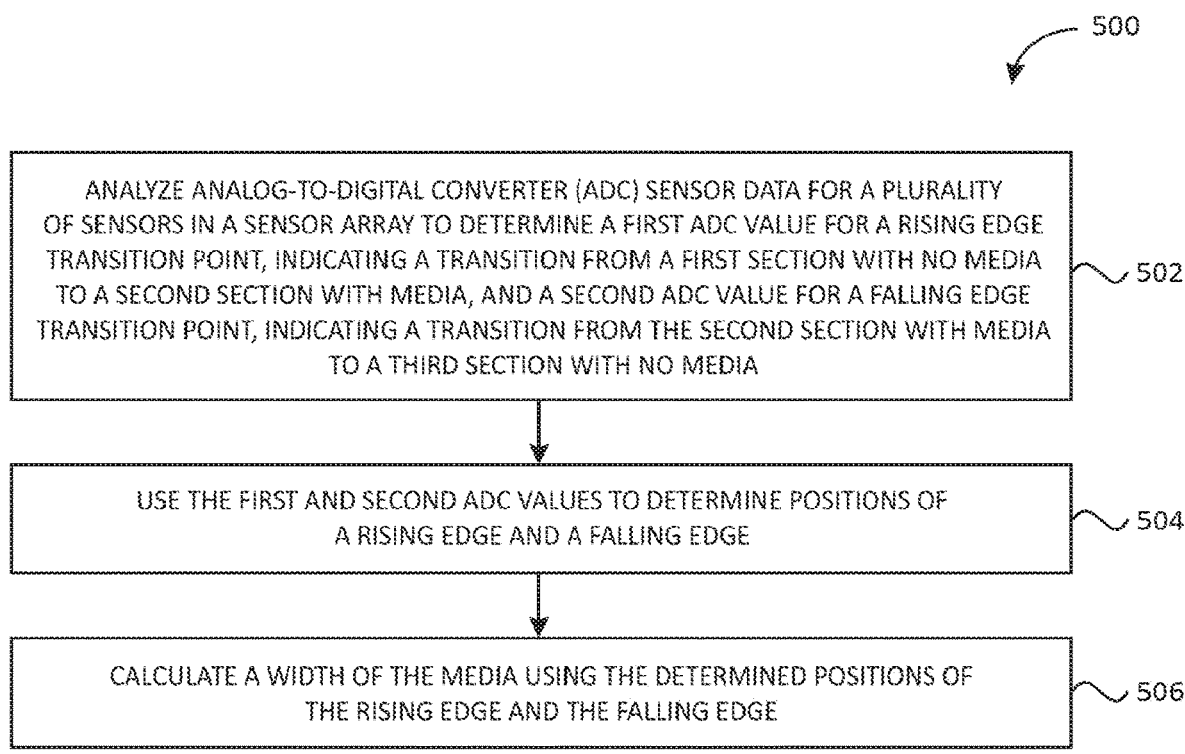
FIG. 5A schematically depicts a method of detecting the width of media, according to another embodiment.

FIG. 5A shows a method 500 of detecting the width of media, according to another embodiment. At 502, analog-to-digital converter (ADC) sensor data is analyzed to determine a first ADC value for a rising edge transition point, indicating a transition from a first section with no media to a second section with media, and a second ADC value for a falling edge transition point, indicating a transition from the second section with media to a third section with no media. At 504, the first and second ADC values are used to determine positions of a rising edge and a falling edge. And at 506, a width of the media is calculated using the determined positions of the rising edge and the falling edge.

In an embodiment, using the first and second ADC values, 504, provided by a first and a second sensor, respectively, can include determining ADC values for sensors surrounding the first and second sensors. The method 500 can further include using the ADC values of the surrounding sensors to determine positions of the rising edge and the falling edge, which may correspond to a transition from the first section with no media to the second section with media to the third section with no media, respectively.

In an embodiment, the method 500 can be used for width detection of media and/or ribbon in a center bias printer. For example, the method 500 can be used in a portable or a desktop printer. The method 500 can be applied to detecting small offset of the media along the width. For example, the offset may stem from mechanical tolerance. The method 500 can further include collecting the ADC data for a plurality of sensors in a sensor array.

FIG. 5B shows an example of implementation 510 of the method 500 described in relation to FIG. 5A, according to an embodiment. Values which may be hardcoded in the system, include: 'SensorPitch' (distance between two sensors); 'ErrorCorrection' (standard offset predefined during printer development to bring the calculated width to the real width); and 'SafeMargin' (number of sensors acting as neighbors to the 'mid.value' position being checked on each side to determine a 'safe.Low' and 'safe.High' values).

In an embodiment, the method 510 includes 512, collecting ADC sensor data for each sensor in an array, performed by a printer algorithm. At 514, two transition points are determined: between a section with no media and a section with media ('r.mid.value')—also referred to as a rising edge; and between the section with media and a section with no media ('f.mid.value')—also referred to as a falling edge. At 516, it is determined what represents an ADC value with media present and an ADC value with no media present, for the two transition points determined at 514. At this point, following ADC values are known: no media after the falling edge ('f.safe.Low'); media before the falling edge ('f.safe.High'); no media after the rising edge ('r.safe.Low'); media before the rising edge ('r.safe.High'). At 518, 529, and 522 internal threshold values corresponding to middle points ('f.threshold.1' and 'r.threshold.2'), and deltas between different ADC states ('f.delta.safe.HL', 'r.delta.safe.HL', 'f.delta.mid-th' and 'r.delta.mid-th') are calculated for the falling and rising edge data points, respectively. At 524, a position of a mid.value relative to the no-media and media value is examined to calculate a position of each edge ('r.media.edge' for the rising edge value, and 'f.media.edge' for the falling edge value). At 526, the width of the media is calculated as a difference between the falling edge and the rising edge:

width=f.media.edge−r.media.edge.

Figure 5C:
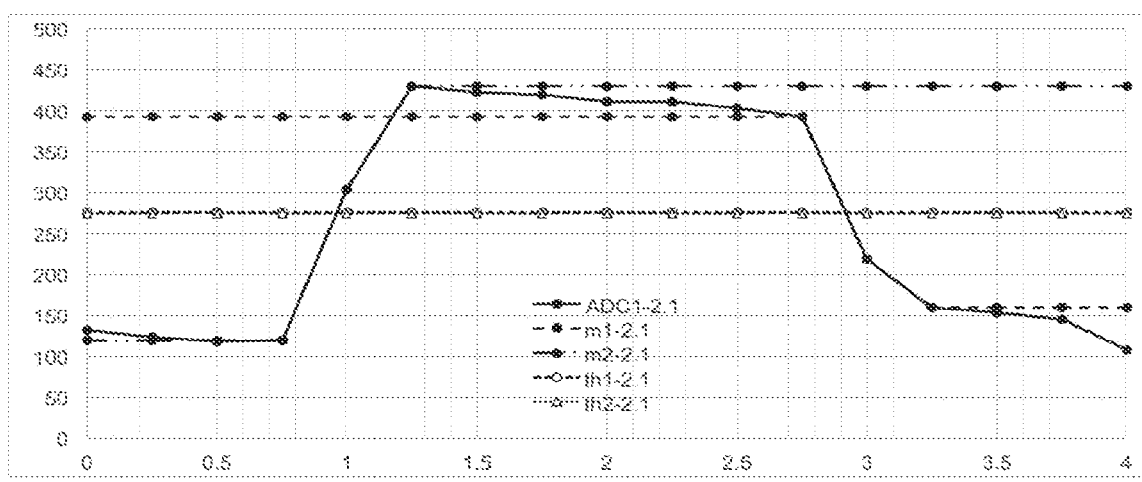
FIG. 5C schematically depicts experimental data acquired using the method of FIG. 5B.

FIG. 5C and Tables 2A and 2B show experimental data acquired using the method 510, shown in FIG. 5B. Following values were hardcoded: dpi=203; SensorPitch=0.25; SafeMargin=1; f.ErrorCorrection=0.05; and r.ErrorCorrection=0.05.

The data was collected using one media sample; media 1 was 2.1 in wide, and the algorithm detected 2.0628 in width.

TABLE 2A

Experimental data for width detection obtained with method 510 (steps 512-514).

| | | Step 512 | | | | | Step 514 |
|---|---|---|---|---|---|---|---|
| # | pos | ADC1-2.1 | m1-2.1 | m2-2.1 | th1-2.1 | th2-2.1 | delta1 |
| 1 | 0 | 132 | 393 | 119 | 276 | 274.5 | 0 |
| 2 | 0.25 | 123 | 393 | 119 | 276 | 274.5 | 14 |
| 3 | 0.5 | 118 | 393 | 119 | 276 | 274.5 | 4 |
| 4 | 0.75 | 119 | 393 | 119 | 276 | 274.5 | −186 |
| 5 | 1 | 304 | 393 | 304 | 276 | 274.5 | −311 |
| 6 | 1.25 | 430 | 393 | 430 | 276 | 274.5 | −118 |
| 7 | 1.5 | 422 | 393 | 430 | 276 | 274.5 | 11 |
| 8 | 1.75 | 419 | 393 | 430 | 276 | 274.5 | 11 |
| 9 | 2 | 411 | 393 | 430 | 276 | 274.5 | 8 |
| 10 | 2.25 | 411 | 393 | 430 | 276 | 274.5 | 8 |
| 11 | 2.5 | 403 | 393 | 430 | 276 | 274.5 | 18 |
| 12 | 2.75 | 393 | 393 | 430 | 276 | 274.5 | 184 |
| 13 | 3 | 219 | 219 | 430 | 276 | 274.5 | 234 |
| 14 | 3.25 | 159 | 159 | 430 | 276 | 274.5 | 65 |
| 15 | 3.5 | 154 | 159 | 430 | 276 | 274.5 | 14 |
| 16 | 3.75 | 145 | 159 | 430 | 276 | 274.5 | 46 |
| 17 | 4 | 108 | 159 | 430 | 276 | 274.5 | 145 |

TABLE 2B

Experimental data for width detection obtained with method 510 (steps 514-526).

| | Media 1 | Falling edge | | Rising edge |
|---|---|---|---|---|
| Step 514 | Max.Delta | 234 | Min.Delta | −311 |
| | f.pos (in) | 3 | r.pos (in) | 1 |
| | f.mid.value | 219 | r.mid.value | 304 |
| Step 516 | f.safe.Low | 159 | r.safe.Low | 119 |
| | f.safe.High | 393 | r.safe.High | 430 |
| Step 518 | f.threshold.1 | 276 | r.threshold.2 | 274.5 |
| Step 520 | f.delta.safe.HL | 234 | r.delta.safe.HL | 311 |
| Step 522 | f.delta.mid-th | −57 | r.delta.mid-th | 29.5 |
| Step 524 | f.media edge | 2.989102564 | r.media edge | 0.926286174 |
| Step 526 | media width | | 2.06281639 | |

TABLE 2B-continued

Experimental data for width detection obtained
with method 510 (steps 514-526).

| Media 1 | | Falling edge | Rising edge |
|---|---|---|---|
| Verification with real media | real size | | 2.1 |
| | error in inches | | 0.037 |
| | error in dot | | 7.55 |

Figure 5D:
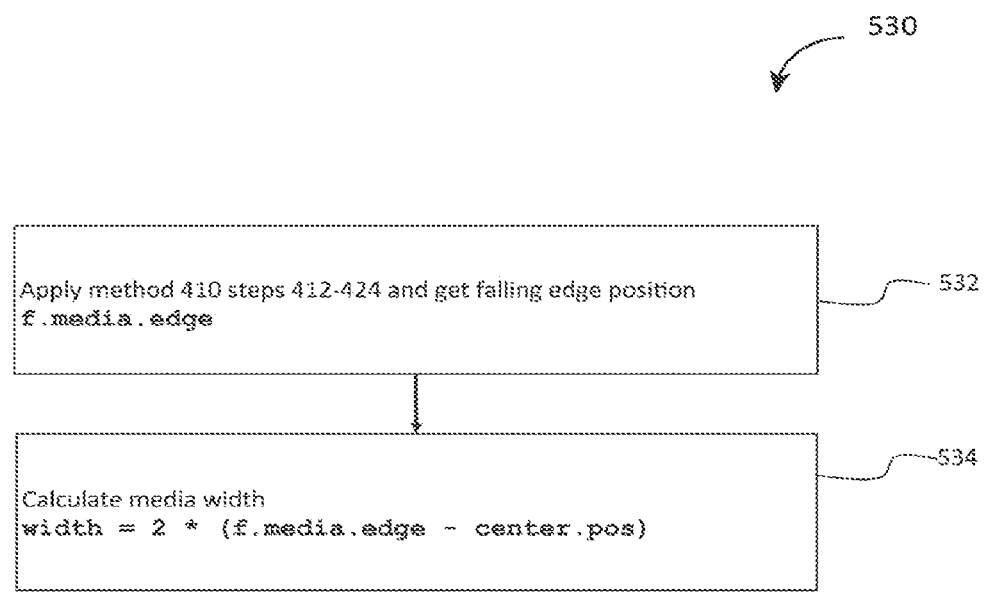
FIG. 5D schematically depicts a variation of the method of FIG. 5B, according to an embodiment.

FIG. 5D shows a variation 530 of a method of detecting the width of media, according to another embodiment. The method 530 can be applied for a center bias printer, for example. At 532, a position of a falling edge ('f.media.edge') is determined. For example, the position can be calculated using a method similar to the method 410. At 540, a width is calculated as double the distance between a center-width of a printer ('center.pos') and the falling edge:

width=2*(f.media.edge−center.pos), where 'center.pos' can be a hardcoded value. For example, for 4 in printer width, it will equal 2 in.

Figure 5E:
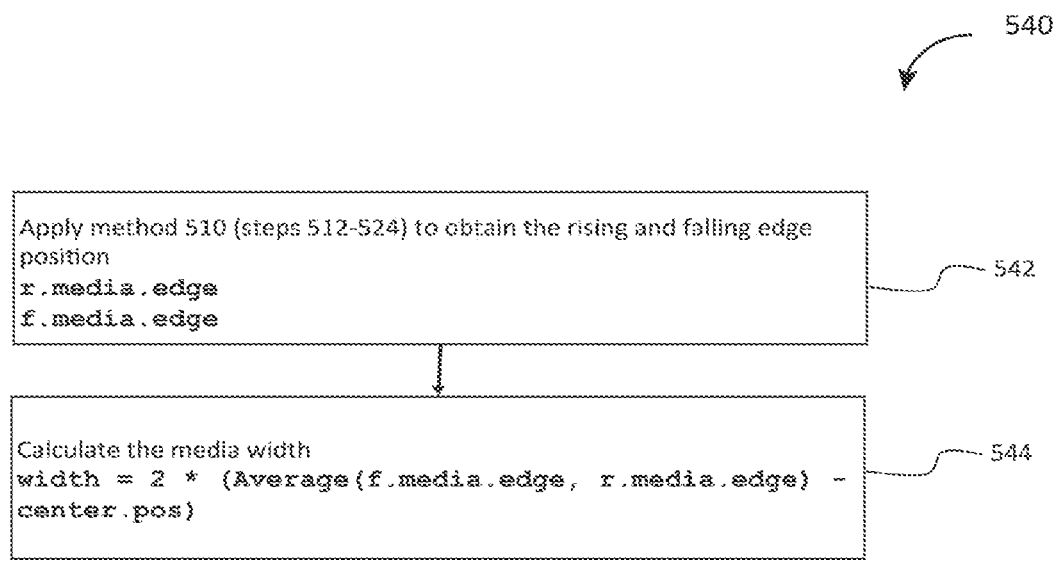
FIG. 5E schematically depicts a variation of the method of FIG. 5B, according to another embodiment.

FIG. 5E shows another variation 540 of a method of detecting the width of media, according to an embodiment. The method 540 can be applied for a center bias printer, for example. At 542, a falling and rising media edges are calculated. For example, the positions ('r.media.edge' and 'f.media.edge') can be calculated using a method similar to the method 510, with an exception of the 526. Instead, at 544, a width is calculated as double the distance between an average between the two edge values and a center-width of a printer:

width=2*(Average(f.media.edge, r.media.edge)−center.pos), where 'center.pos' can be a hardcoded value. For example, for 4 in printer width, it will equal 2 in.

FIG. 6 shows a method 600 of detecting the width of media, according to another embodiment. At 602, a first width of a media is calculated using first sensor data collected for a transmissive sensor array. At 604, a second width of the media is calculated using second sensor data collected for a reflective sensor array. And at 606, a third width of the media is calculated using the first and second widths of the media. The transmissive sensor array includes an array of sensors facing an array of LEDs in such a way that the media can pass between the sensor array and the LED array. The sensors of the transmissive sensor array are configured to detect light produced by the LEDs and not blocked by the media. The reflective sensor array includes an array of sensors paired with an array of LEDs in such a way that the media can pass above the sensor-LED pairs. The sensors of the reflective sensor array are configured to detect light produced by the LEDs and reflected by the media.

In an embodiment, the method 600 can further include calculating the third width of the media using the first and second widths taken with predetermined multiplicative coefficients. For example, the multiplicative coefficient for the first width can be set to exceed the multiplicative coefficient for the second width. The method 600 can also be applied for detecting the width of a ribbon. The method 600 can be applied to printers having both transmissive and reflective sensor arrays.

Figure 6A:
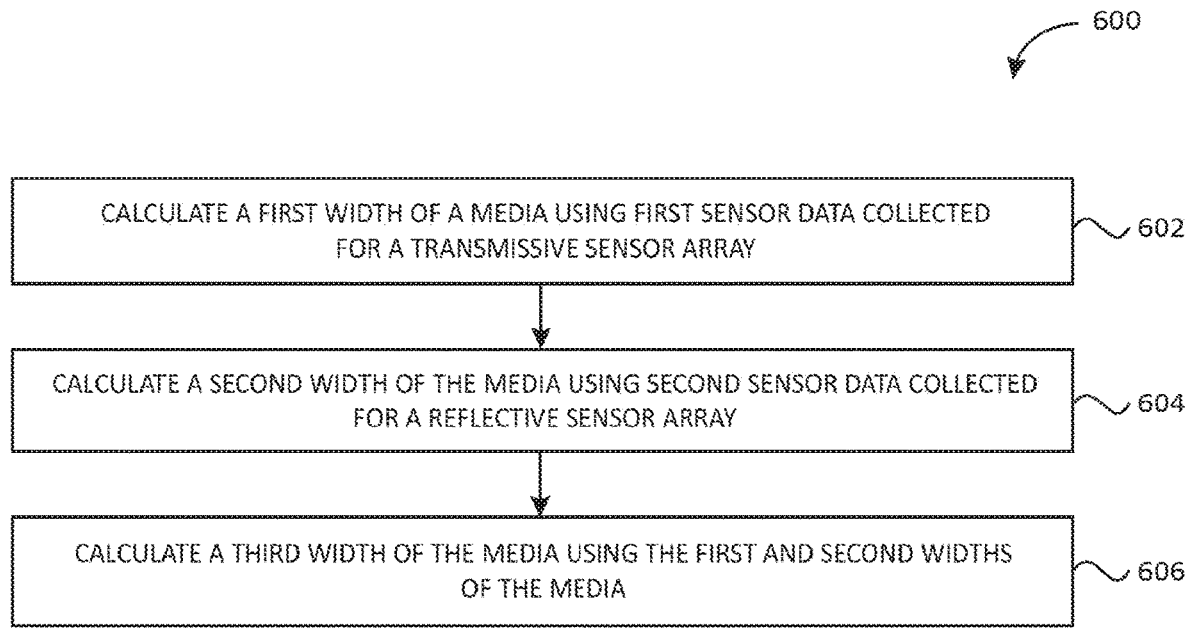
FIG. 6A schematically depicts a method of detecting the width of media, according to yet another embodiment.
Figure 6B:
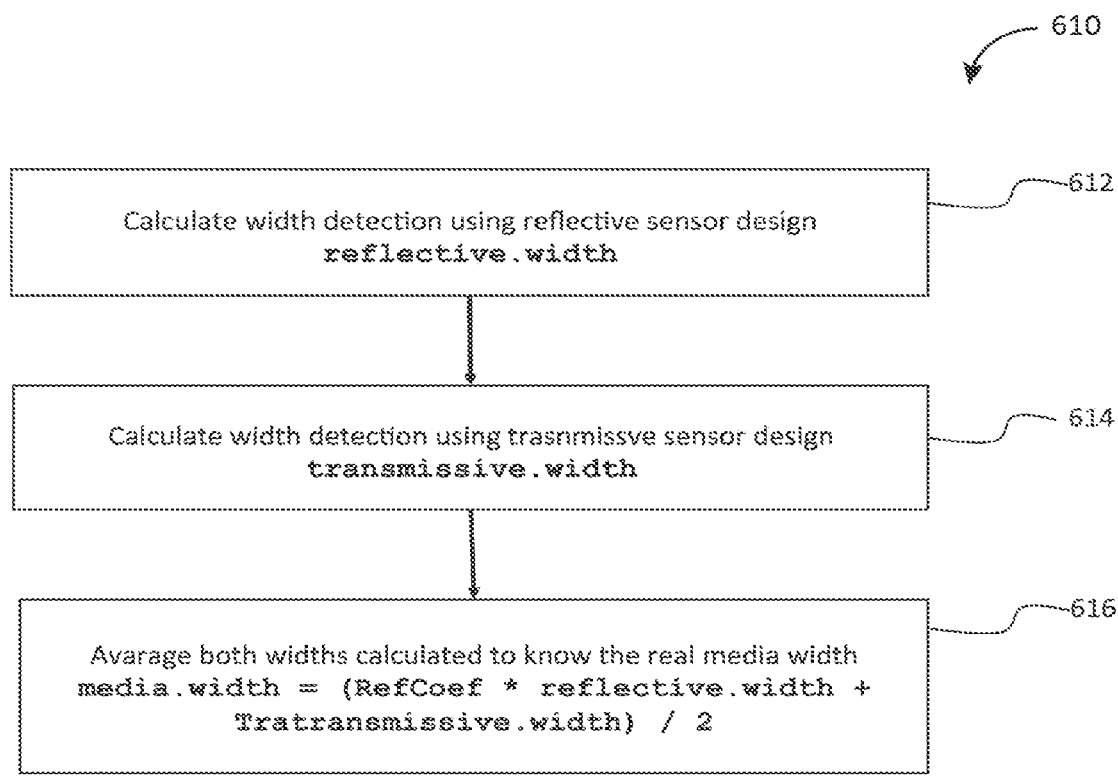
FIG. 6B schematically depicts an example of implementation of the method of FIG. 6A, according to an embodiment.

FIG. 6B shows an example of implementation 610 of the method 600 described in relation to FIG. 6A, according to an embodiment. Values which may be hardcoded in the system, include: 'RefCoef' (multiplicative coefficient for the 'reflective.width'), and 'IransCoef' (multiplicative coefficient for the 'transmissive.width').

In an embodiment, the method 610 includes 612, calculating a first width 'reflective.width' using a reflective method. At 614, a second width 'transmissive.width' is calculated using a transmissive method. For example, the reflective method can include width detection using a reflective sensor array as described above, and transmissive method can include width detection using a transmissive sensor array as described above. At 616, a third width is calculated as an average of the first width and the second width, both values taken with a corresponding multiplicative coefficient ('RefCoef' and 'TranCoef', respectively). The multiplicative coefficients may be assigned based on an anticipated relative accuracy of the width-detecting methods. For example, the 'RefCoef' may be set to be higher than the 'TranCoef'.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

EXAMPLE EMBODIMENTS

A1. A method of detecting the width of media, comprising:

analyzing analog-to-digital converter (ADC) sensor data for a plurality of sensors in a sensor array to determine which sensor of the sensor array provided an ADC value for a transition point between a section with a media and a section with no media;

determining which neighbor sensor provided a substantially high ADC value (ADC_high), and which neighbor sensor provided a substantially low ADC value (ADC_low); and using the ADC_high and ADC_low values to calculate a width of the media.

A2. The method according to embodiment A1, wherein using the ADC_high and ADC_low values includes calculating a threshold middle ADC value between the ADC_high and ADC_low values, calculating a difference value between the ADC_high and ADC_low values, and/or calculating a difference between the threshold middle ADC value and the transition point ADC value.

A3. The method according to embodiment A1, further including using a linear ratio to calculate the width of the media.

A4. The method according to embodiment A1, further including collecting the ADC sensor data.

B1. A method of detecting the width of media, comprising:

analyzing analog-to-digital converter (ADC) sensor data for a plurality of sensors in a sensor array to determine a first ADC value for a rising edge transition point, indicating a transition from a first section with no media to a second section with media, and a second ADC value for a falling edge transition point, indicating a transition from the second section with media to a third section with no media;

using the first and second ADC values to determine positions of a rising edge and a falling edge; and calculating a width of the media using the determined positions of the rising edge and the falling edge.

B2. The method according to embodiment B1, wherein using the first and second ADC values provided by a first and a second sensor, respectively, includes determining ADC values for sensors surrounding the first and second sensors.

B3. The method according to embodiment B2, further including using the ADC values of the surrounding sensors to determine positions of the rising edge and the falling edge.

C1. A method of detecting the width of media, comprising:

calculating a first width of a media using first sensor data collected for a transmissive sensor array;

calculating a second width of the media using second sensor data collected for a reflective sensor array; and calculating a third width of the media using the first and second widths of the media;

wherein the transmissive sensor array includes an array of sensors
  facing an array of LEDs in such a way that the media can pass between the sensor array and the LED array, and
  configured to detect light produced by the LEDs and not blocked by the media; and wherein the reflective sensor array includes an array of sensors
  paired with an array of LEDs in such a way that the media can pass above the sensor-LED pairs, and
  configured to detect light produced by the LEDs and reflected by the media.

C2. The method according to embodiment C1, further including calculating the third width of the media using the first and second widths taken with predetermined multiplicative coefficients.

C3. The method according to embodiment C2, further including using a predetermined multiplicative coefficient for the first width exceeding a predetermined multiplicative coefficient for the second width.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;

U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;

U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a *Laser Scanning Module Employing an Elastomeric U-Hinge Based Laser Scanning Assembly,* filed Feb. 7, 2012 (Feng et al.);
U.S. patent application Ser. No. 29/458,405 for an *Electronic Device,* filed Jun. 19, 2013 (Fitch et al.);
U.S. patent application Ser. No. 29/459,620 for an *Electronic Device Enclosure,* filed Jul. 2, 2013 (London et al.);
U.S. patent application Ser. No. 29/468,118 for an *Electronic Device Case,* filed Sep. 26, 2013 (Oberpriller et al.);
U.S. patent application Ser. No. 14/150,393 for *Indicia-reader Having Unitary Construction Scanner,* filed Jan. 8, 2014 (Colavito et al.);
U.S. patent application Ser. No. 14/200,405 for *Indicia Reader for Size-Limited Applications* filed Mar. 7, 2014 (Feng et al.);
U.S. patent application Ser. No. 14/231,898 for *Hand-Mounted Indicia-Reading Device with Finger Motion Triggering* filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for *Docking System and Method Using Near Field Communication* filed Apr. 21, 2014 (Showering);
U.S. patent application Ser. No. 14/264,173 for *Autofocus Lens System for Indicia Readers* filed Apr. 29, 2014 (Ackley et al.);
U.S. patent application Ser. No. 14/277,337 for *MULTI-PURPOSE OPTICAL READER,* filed May 14, 2014 (Jovanovski et al.);
U.S. patent application Ser. No. 14/283,282 for *TERMINAL HAVING ILLUMINATION AND FOCUS CONTROL* filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method, comprising:
   producing light, by a set of light emitting diode (LEDs) of a sensor-LED array, wherein the sensor-LED array comprises a set of optical sensors and the corresponding set of LEDs positioned within a printing apparatus, wherein the light produced is directed to cover a maximum width of a printing media;
   detecting the light, by the set of optical sensors of the sensor-LED array, and producing analog signals that have a magnitude proportional to an amount of detected light at respective optical sensors; and
   receiving and processing, by a signal receiving assembly, the analog signals from the optical sensors to determine a width of the media based on the magnitude of the analog signals.

2. The method according to claim 1, wherein the detecting light further comprises detecting reflected light from the printing media.

3. A method for detecting printing media width, comprising:
   analyzing sensor data for a plurality of optical sensors in an array of sensor-LED pairs, wherein the sensor data corresponds to a plurality of values corresponding to different regions;
   determining a first sensor value that corresponds to first region that comprises printing media, and a second sensor value that corresponds to a second region that does not comprise printing media, and a third sensor value that corresponds to a third region that is a transition region that comprises a first subregion of no printing media, and a second subregion of printing media, wherein the first sensor value is higher than the second sensor value; and
   calculating the printing media width based on the first, second and third sensor values.

4. A method for detecting printing media width according to claim 3, comprising:
   analyzing analog-to-digital converter (ADC) sensor data;
   determining, from the analyzed ADC sensor data, a first ADC value for a rising edge transition point, indicating a transition from a first section with no printing media to a second section with printing media;
   determining, from the analyzed ADC sensor data, a second ADC value for a falling edge transition point, indicating a transition from the second section with printing media to a third section with no printing media; and
   calculating, based on the transition point of rising edge and the transition point falling edge, the printing media width.

5. The method according to claim 4, wherein:
   determining the first ADC value and the second ADC value at least in part by a first sensor and a second sensor respectively; and
   determining the first and second ADC values at least in part by sensors surrounding the first and second sensors.

6. The method according to claim 4, wherein determining a rising edge position and a falling edge position based on the first ADC value and the second ADC value.

7. The method according to claim 4, wherein the width of the media is calculated using the determined positions of the rising edge and the falling edge.

8. The method according to claim 7, wherein determining positions of the rising edge transition point and the falling edge transition point using ADC values of the surrounding sensors, the positions correspond to a transition from the first section with no media to the second section with media to the third section with no media, respectively.

9. The method according to claim 3, further comprising calculating a threshold middle ADC value based on the first sensor value and the second sensor value.

10. The method according to claim 9, further comprising calculating a difference between the threshold middle ADC value and the first ADC value.

11. The method according to claim 3, further comprising calculating a difference between the first sensor value and the second sensor value.

12. The method according to claim 3, wherein calculating the printing media width is based on a linear ratio.

13. The method according to claim 3, wherein:
   determining the printing media width in a spine align bias printer; or
   determining the printing media width in a center align bias printer.

14. A method for detecting a printing region, comprising:
   producing light, by a light emitting diode in a first assembly, wherein the light is directed toward a path of a printing ribbon;
   producing a first analog signal, by a first sensor of a second assembly in response to receiving the light produced by the light emitting diode, wherein the second assembly is disposed at a predetermined distance away from the first assembly and facing the printing ribbon and the first assembly, producing a second analog signal, by a second sensor proximal to the light emitting diode in the first assembly, in response to receiving the light produced by the light emitting diode; and receiving and processing, by an analog signal receiving assembly, a combined analog signal from the first sensor and the second sensor to determine a width of the printing ribbon.

15. The method according to claim 14, wherein:

the combined analog signal is high when light produces by the light emitting diode is not blocked by the printing ribbon; and the combined analog signal is low when the light produced by the light emitting diode is blocked by the printing ribbon.

16. The method according to claim 14, wherein a high value and low value of the combined analog signal is used to detect the width of the printing ribbon.

17. The method according to claim 14, wherein a threshold middle value of the combined analog is calculated to detect the width of media/ribbon.

18. The method according to claim 14, wherein a difference of a high value and low value of the combined analog signal is calculated to detect the width of the printing ribbon.

19. The method according to claim 14, further comprising converting the combined analog signal received from the analog signal receiving assembly into a digital value.

\* \* \* \* \*